C. A. BLUME.
MOWER.
APPLICATION FILED JAN. 28, 1919.
1,362,667. Patented Dec. 21, 1920.
3 SHEETS—SHEET 3.
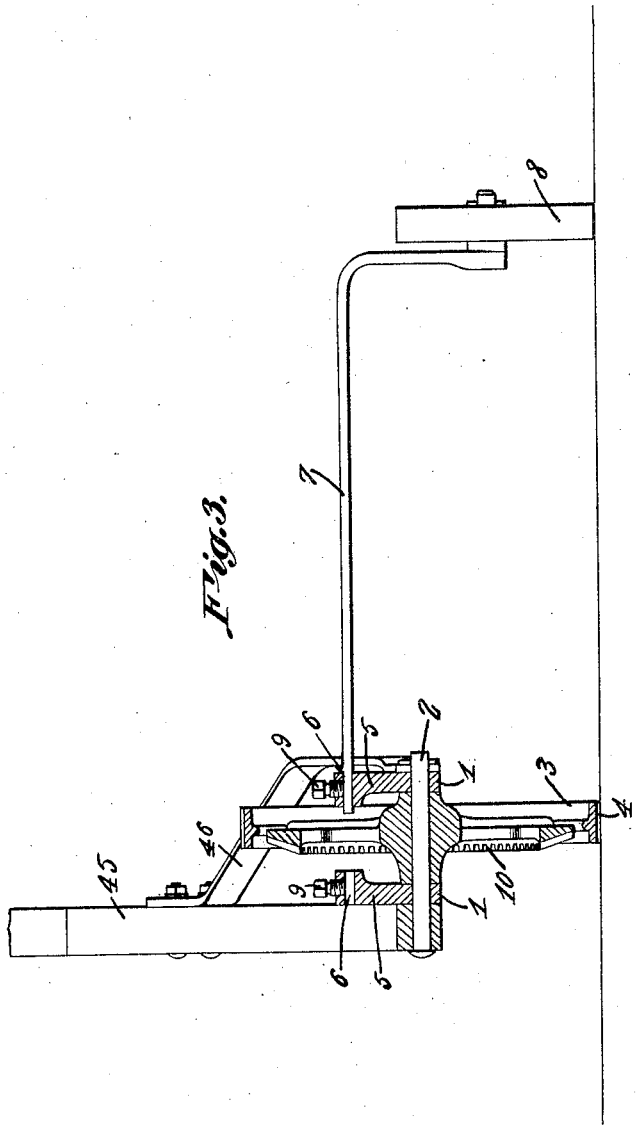
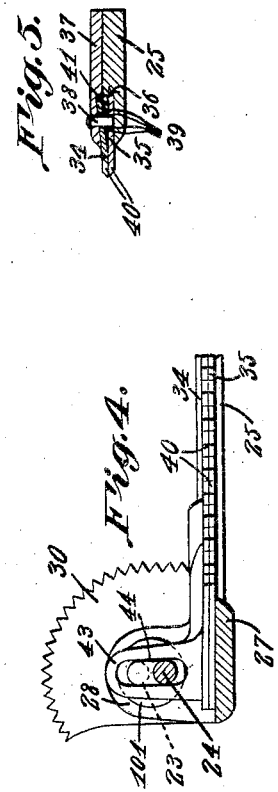

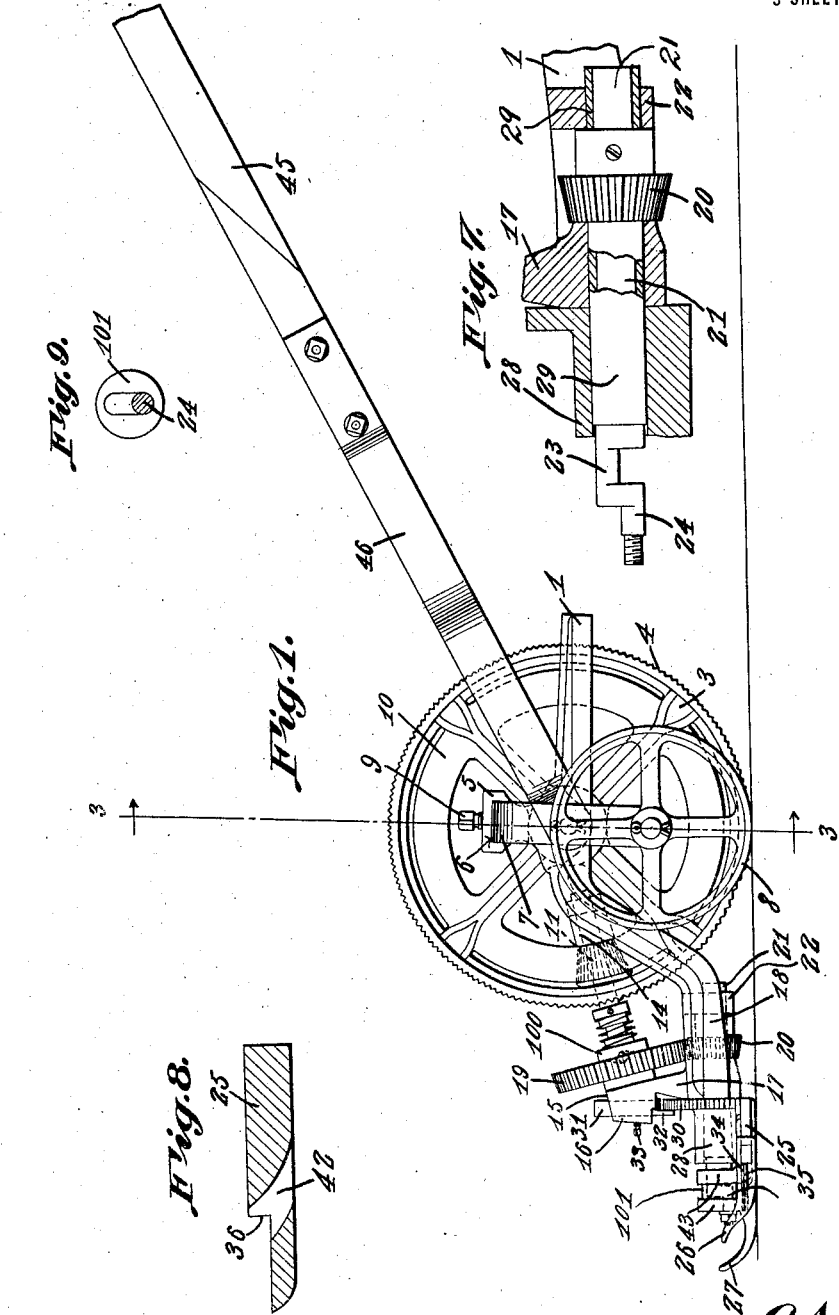

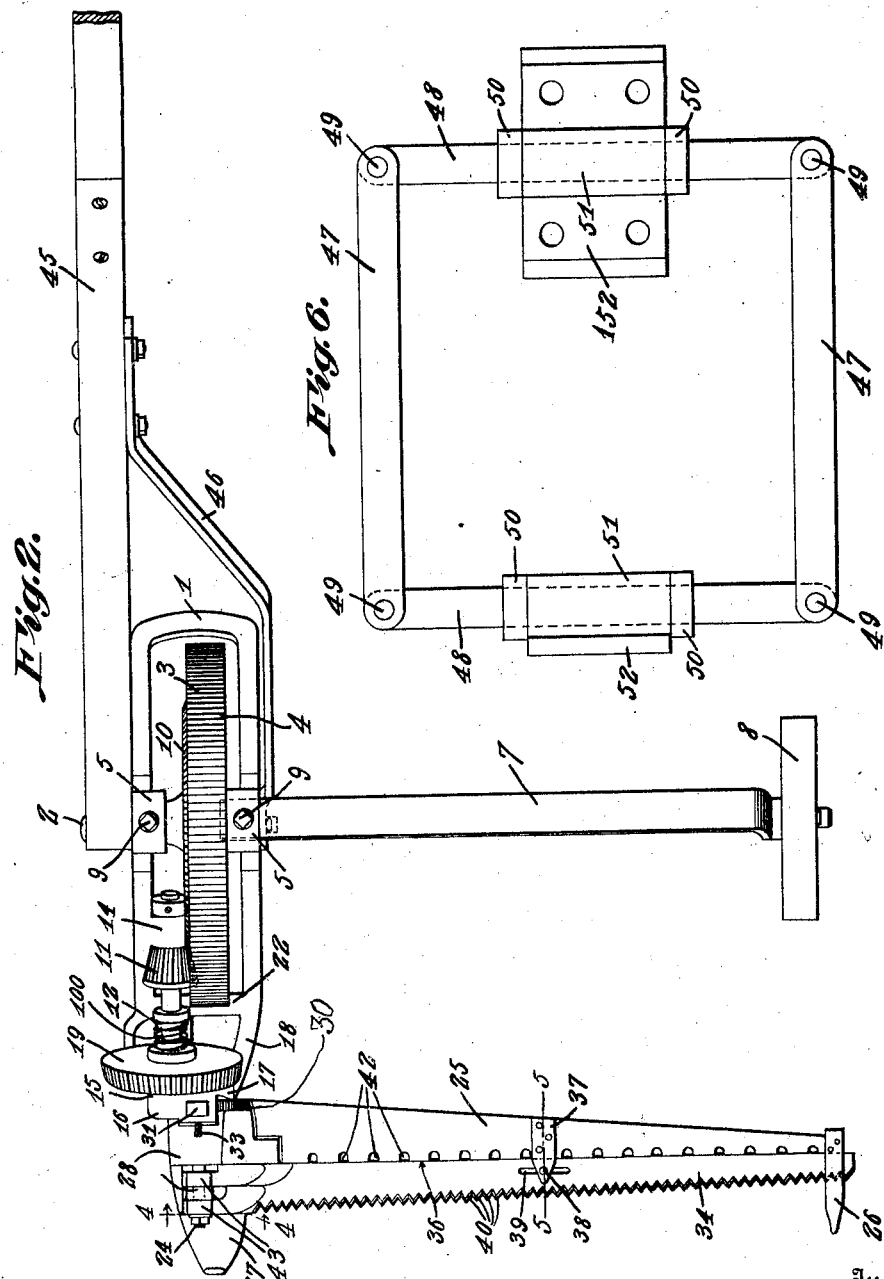

UNITED STATES PATENT OFFICE.

CHARLES A. BLUME, OF GALESBURG, ILLINOIS.

MOWER.

1,362,667.  Specification of Letters Patent.  Patented Dec. 21, 1920.

Application filed January 28, 1919. Serial No. 273,524.

*To all whom it may concern:*

Be it known that I, CHARLES A. BLUME, a citizen of the United States, residing at Galesburg, in the county of Knox and State of Illinois, have invented a new and useful Mower, of which the following is a specification.

The device forming the subject matter of this application is a mower, and one object is to provide a mower which, when constructed to serve as a lawn mower, will cut the grass in advance of the ground wheel, so that the ground wheel will not crush down the grass before the grass has been cut.

Another object of the invention is to provide novel means for actuating the cutter bars.

A further object of the invention is so to construct the cutter bars that they will clear themselves of dirt.

Another object of the invention is to provide novel means for supporting the cutter bars at various angles with respect to the surface of the ground.

In the accompanying drawings:—

Figure 1 shows in side elevation, a device constructed in accordance with the invention; Fig. 2 is a top plan; Fig. 3 is a section on the line 3—3 of Fig. 1; Fig. 4 is a section on the line 4—4 of Fig. 2; Fig. 5 is a section on the line 5—5 of Fig. 2; Fig. 6 is an elevation showing a frame which is used when the device is connected with a tractor, instead of being used as a lawn mower as shown in Fig. 2; Fig. 7 is a sectional detail showing the mounting of one of the shafts; Fig. 8 is a fragmental cross section taken through the arm which supports the cutter bars; Fig. 9 is a cross sectional detail.

In carrying out the invention there is provided a loop-shaped main frame 1 in which an axle 2 is mounted. A main ground wheel 3 rotates on or with the axle 2 and is located between the side portions of the main frame 1, the ground wheel having a toothed periphery 4, so that the ground wheel may secure a driving hold on the surface of the soil. The side portions of the frame 1 are supplied with upstanding lugs 5 having openings 6. In either of the openings 6, the inner end of a laterally extended T-shaped support may be placed, an auxiliary ground wheel 8 being journaled on the outer end of the support. Set screws 9 are threaded into the lugs 5 and are adapted to engage, one at a time, the inner end of the support 7. Obviously, the support 7 and the auxiliary ground wheel 8 may be located on either side of the frame 1, as occasion may demand.

A gear wheel 10 is formed integrally with or secured to, one side of the main ground wheel 3, and meshes into a pinion 11 on a downwardly inclined shaft 12 journaled in a bearing 14, located on one side portion of the main frame 1, and journaled in a bearing 15 formed on one side of a head 16 located at the upper end of a post 17, the post being mounted on the forward end of the loop-shaped frame 1. The forward portion of the loop-shaped main frame 1 is downwardly and forwardly extended as denoted by the numeral 18. A gear wheel 19 is connected to the shaft 12 by a noiseless ball ratchet 100 of any desired construction and is located to the rear of the head 16 on the post 17. The gear wheel 19 meshes into a pinion 20 on a shaft 21 extended through a cross bar 22 connecting the side portions of the frame. The shaft 21 is journaled in a tubular bearing 29 mounted in the forward portion of the frame 1. The forward end of the shaft 21 is supplied with cranks 23 and 24.

The numeral 25 denotes a laterally extended arm, equipped at its outer end with a shoe 26, and supplied at its inner end with a shoe 27. The inner end of the arm 25 carries a socket 28 mounted to rock on the tubular bearing 29, the construction being such that the arm 25 may be swung upwardly or downwardly, for adjustment, thereby to regulate the height of the cutter bars 35 and 34 (hereinafter described) with respect to the surface of the soil. A segment 30 is mounted on the inner end of the arm 25, and the head 16 on the frame 1 overhangs the segment. A latch 31 is vertically adjustable in the head 16, the lower end of the latch being adapted to coöperate with the segment 30, and the latch having a finger 32 which overlaps the segment 30, to hold the arm 25 on the tubular bearing 29 for swinging movement in a vertical plane. A set screw 33 is threaded into the head 16 and is adapted to engage the latch 31.

A lower cutter bar 35 is mounted to reciprocate on the arm 25, and an upper cutter bar 34 is mounted to reciprocate on top of the lower cutter bar, the arm 25 having a shoulder 36 against which the rear edge of the cutter bar 35 abuts. The outer edges of the cutter bars 34 and 35 reciprocate in the shoe 26, the cutter bars being held down on the arm 25 by a finger 37 having a guide pin 38, the cutter bars 34 and 35 having slots 39 wherein the guide pin 38 is received. The adjacent surfaces of the teeth 40 on the cutter bars 34 and 35 are in contact, but, as shown at 41, the cutter bars diverge transversely or rearwardly so that the dirt which may find its way between the cutter bars will with equal facility find an exit from between the cutter bars, the dirt passing through openings 42, extended diagonally downwardly through the arm 25 as shown in Fig. 8, the openings being located at the shoulder 36 in the arm.

The inner ends of the cutter bars 34 and 35 are supplied with upstanding lugs 43 having slots 44, the slot 44 in the lug 43 of one cutter bar receiving the crank 23, and the corresponding slot of the lug on the other cutter bar receiving the crank 24. A washer 101 is located between the lugs 43 and is mounted on the part which connects the cranks 23 and 24. Obviously, when the shaft 21 is rotated, a reciprocating movement will be imparted to the cutter bars 34 and 35.

The main frame 1 may be supported and guided in any desired way. Thus, if the structure hereinbefore described is embodied in a lawn mower, a handle 45 may be used, the same carrying a laterally offset bracket 46, the axle 2 being mounted in the handle and in the bracket. If it is desired to assemble the mower with a tractor, then recourse is had to a frame shown in Fig. 6, the frame including horizontal bars 47 and vertical bars 48, the ends of the bars 47 and 48 being pivotally connected as shown at 49 so that the frame can yield vertically. The bars 48 carry collars 50, between which are located bearings 51, constituting parts of attaching plates 52 and 152. In Fig. 6, the plate 152 is disposed at right angles to the plate 52, in order that the outline of these plates may appear clearly, but, in practice, the plates 52 and 152 stand parallel to each other. The handle 45 may be removed, its place being taken by any suitable element to which the plate 52 may be bolted conveniently, such a change falling well within the skill of a mechanic. The plate 152 is bolted to the side of a tractor (not shown). It will be understood that the frame, comprising the bars 47 and 48, is adapted to yield vertically, thereby permitting the mower to conform to, and to follow, the surface of the soil, when the mower is attached to a tractor.

In operation, the mower is supported on the main ground wheel 3 and on the auxiliary ground wheel 8, the member 7 and the wheel 8, of course, serving to prevent the mower from tilting laterally. As hereinbefore stated, the support 7 and the wheel 8 may be located at either side of the frame 1, it being possible to insert the inner end of the support 8 into either of the lugs 5 on the frame 1. When the mower is advanced over the ground, the wheel 3 will be rotated by contact with the soil, the gear wheel 10 driving the shaft 12 by way of the pinion 11, and rotation being imparted to the shaft 21 by way of the gear wheel 19 and the pinion 20. When the shaft 21 is rotated, the cutter bars 34 and 35 will be moved longitudinally on the arm 25 by the cranks 23 and 24. Any dirt which may enter between the cutter bars 34 and 35 will find its way outwardly and rearwardly, because the cutter bars diverge, considered transversely, as shown at 41, the openings 42 in the arm 25 affording an exit for the dirt. The outer end of the arm 25 and, consequently, the outer ends of the cutter bars 34 and 35 may be adjusted vertically, the socket 28 rocking on the tubular bearing 29. After the arm 25 and the cutter bars 34 and 35 have been adjusted as above described, the arm and the cutter bars may be held in place at the desired angle with respect to the surface of the soil, by engaging the lower end of the latch 31 with the segment 30 on the inner end of the arm 25, the latch being held in place by the set screw 33.

Having thus described the invention, what is claimed is:—

1. In a device of the class described, a main frame; an arm carried by the frame and having an elongated shoulder; a lower cutter bar mounted to reciprocate on the arm in contact with the shoulder; an upper cutter bar mounted to reciprocate on the lower cutter bar in contact with the shoulder, the cutter bars having teeth which are in contact, the cutter bars diverging from the teeth rearwardly toward the shoulder, and the arm having an outlet opening formed therein and located at the shoulder, the opening coöperating with the space existing between the diverging portions of the cutter bars.

2. In a device of the class described, a frame; a post carried by the forward end of the frame; a ground wheel journaled on the frame; a shaft journaled on the post; means for operatively connecting the shaft with the ground wheel; a second shaft journaled in the frame; means for operatively connecting the shafts; an arm mounted to rock on the frame; a cutter bar reciprocating on the arm; means for operatively connecting the cutter bar with the second shaft; a segment constituting a part of the arm; and a latch coacting with the segment, the latch being slidably mounted in the post.

3. In a device of the class described, a loop-shaped main frame; a ground wheel journaled within the frame; a lateral support; a second ground wheel journaled on the outer end of the support; means for securing the inner end of the support rigidly to either side of the loop-shaped frame; a lateral arm carried by the forward end of the loop-shaped frame; a cutter bar mounted to reciprocate on the arm; and means for connecting the cutter bar operatively with the ground wheel.

4. In a device of the class described, a main frame provided at its forward end with a forwardly extended tubular bearing; an arm having a socket surrounding the bearing and mounted to rock thereon; means carried by the frame and coöperating with the arm to hold the arm in adjusted positions when the socket is rocked on the bearing; a cutter bar slidable on the arm; a shaft journaled in the bearing; means for connecting the shaft operatively with the cutter bar; a ground wheel mounted on the frame; and means for connecting the ground wheel operatively with the shaft.

5. In a device of the class described, a frame; a ground wheel journaled on the frame; an arm mounted to swing on the frame and provided with a segment; a cutter bar mounted to reciprocate on the arm; means for connecting the cutter bar with the ground wheel; a latch slidable in the frame and coacting with the segment, the latch having a finger overlapping the side of the segment and holding the arm on the frame for swinging movement; and means for holding the latch in adjusted position.

In testimony that I claim the foregoing as my own, I have hereto affixed my signature in the presence of two witnesses.

CHARLES A. BLUME.

Witnesses:
W. G. CAMERON,
R. J. HOWARD.